United States Patent
Choi et al.

(10) Patent No.: US 9,387,823 B2
(45) Date of Patent: Jul. 12, 2016

(54) PEDESTRIAN AIR-BAG FOR VEHICLE

(71) Applicant: Hyundai Motor Company, Seoul (KR)

(72) Inventors: Jae Ho Choi, Seoul (KR); Jae Haeng Yoo, Yongin-si (KR); Sung Woo Lee, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 76 days.

(21) Appl. No.: 14/333,021

(22) Filed: Jul. 16, 2014

(65) Prior Publication Data

US 2015/0166004 A1    Jun. 18, 2015

(30) Foreign Application Priority Data

Dec. 18, 2013  (KR) .......................... 10-2013-0158786

(51) Int. Cl.
  *B60R 21/36* (2011.01)
  *B60R 21/00* (2006.01)
  *B60R 21/34* (2011.01)

(52) U.S. Cl.
  CPC ......... *B60R 21/36* (2013.01); *B60R 2021/0004* (2013.01); *B60R 2021/0048* (2013.01); *B60R 2021/346* (2013.01)

(58) Field of Classification Search
  CPC .............. B60R 21/36; B60R 2021/346; B60R 2021/0048; B60R 2021/0004
  USPC ....................................................... 180/274
  See application file for complete search history.

(56) References Cited

U.S. PATENT DOCUMENTS

| 7,357,212 | B2 * | 4/2008 | Sasaki ..................... B60R 21/36 180/274 |
| 9,016,425 | B1 * | 4/2015 | Choi ....................... B60R 21/36 180/274 |
| 9,073,513 | B2 * | 7/2015 | Kalliske | |
| 2003/0159875 | A1 * | 8/2003 | Sato ..................... B62D 25/081 180/274 |
| 2005/0206139 | A1 * | 9/2005 | Mori ....................... B60R 21/36 280/730.1 |

(Continued)

FOREIGN PATENT DOCUMENTS

DE  20 2011 052 110 U1   1/2013
FR       2 927 034 A1    8/2009

(Continued)

OTHER PUBLICATIONS

Lube et al. WO 2014 139937, English Machine Translation, Nov. 2015.*

*Primary Examiner* — Karen Beck
(74) *Attorney, Agent, or Firm* — Morgan, Lewis & Bockius LLP

(57) ABSTRACT

A pedestrian air-bag for a vehicle may include a housing coupled to a lower end surface of a windshield side of a hood of the vehicle and having a cut line formed at an upper portion of a rear surface in the housing, and a hinge part formed at a lower portion, wherein the cut line and the hinge part forms an air-bag door, an air-bag module embedded in the housing, and a thermal damage preventing cover spaced apart from a lower portion of the housing, wherein the thermal damage preventing cover covers a lower surface and a front surface of the housing, and includes a rear end portion supporting the hinge part of the housing.

10 Claims, 3 Drawing Sheets

REAR ←          → FRONT

(56) References Cited

U.S. PATENT DOCUMENTS

| | | | |
|---|---|---|---|
| 2006/0042854 A1* | 3/2006 | Sasaki | B60R 21/36 180/274 |
| 2007/0262569 A1* | 11/2007 | Kikuchi | B60R 21/215 280/728.3 |
| 2008/0314672 A1* | 12/2008 | Takimoto | B60R 21/36 180/274 |
| 2010/0307854 A1* | 12/2010 | Mildner | B60R 21/36 180/274 |
| 2014/0034406 A1* | 2/2014 | Kalliske | B60R 21/36 180/271 |
| 2014/0167394 A1* | 6/2014 | Wisniewski | B60R 21/20 280/728.3 |
| 2015/0166004 A1* | 6/2015 | Choi | B60R 21/36 180/274 |

FOREIGN PATENT DOCUMENTS

| | | |
|---|---|---|
| JP | 2005-178587 A | 7/2005 |
| JP | 2005-262953 A | 9/2005 |
| JP | 2007-106155 A | 4/2007 |
| JP | 2010-125996 A | 6/2010 |
| KR | 2003-0085076 A | 11/2003 |
| KR | 10-2010-0089662 A | 8/2010 |
| KR | 10-2012-0075239 A | 7/2012 |
| WO | WO 2014/139937 A2 | 9/2014 |

* cited by examiner

REAR ← → FRONT

REAR ← → FRONT

PEDESTRIAN AIR-BAG FOR VEHICLE

CROSS REFERENCE TO RELATED APPLICATION

The present application claims priority to Korean Patent Application No. 10-2013-0158786, filed on Dec. 18, 2013, the entire contents of which is incorporated herein for all purposes by this reference.

BACKGROUND OF THE INVENTION

1. Field of the Invention

The present invention relates to a pedestrian air-bag for a vehicle installed at a bottom of an engine and inflated when a pedestrian collides with the vehicle to thereby protect the pedestrian from a hood of the vehicle.

2. Description of Related Art

The present invention relates to a thermal damage preventing cover structure of a pedestrian air-bag module. In order to efficiently protect a pedestrian from injury generated in the case in which a vehicle collides head-on with the pedestrian and a head of the pedestrian collides with a hood or a cowl part of a vehicle, a sensor mounted on a bumper senses and determines the pedestrian, transmits a signal, and inflates an air-bag mounted on a lower end portion of the hood of the vehicle.

It is an object to prevent the head of the pedestrian from being directly collided with parts having strong rigidity such as the cowl part or a front pillar of the vehicle by utilizing the inflated air-bag.

The present invention, which relates to a technology associated with a cover structure part of a pedestrian protecting air-bag module inflated from the vehicle, solves a thermal damage problem using a thermal damage preventing cover, an associated structure, and a supporting structure thereof.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a pedestrian air-bag for a vehicle capable of preventing an air-bag module from being thermally damaged by engine heat and providing an optimized shape of a thermal damage preventing cover.

In an aspect of the present invention, a pedestrian air-bag for a vehicle may include a housing coupled to a lower end surface of a windshield side of a hood of the vehicle and having a cut line formed at an upper portion of a rear surface in the housing, and a hinge part formed at a lower portion, wherein the cut line and the hinge part forms an air-bag door, an air-bag module embedded in the housing, and a thermal damage preventing cover spaced apart from a lower portion of the housing, wherein the thermal damage preventing cover covers a lower surface and a front surface of the housing, and may include a rear end portion supporting the hinge part of the housing.

The hinge part of the housing protrudes downwardly from the lower portion of the housing.

The hinge part is provided with a drain hole penetrating through the hinge part toward the thermal damage preventing cover while having an interval.

The housing is coupled to a lower surface of an inner panel of the hood in a state in which the air-bag module is embedded therein, and an upper end of the rear portion of the housing is provided with a fastening hook fastened thereto by penetrating through the inner panel of the hood while having an interval.

A front upper end portion of the housing and a front upper end portion of the thermal damage preventing cover are coupled together to an inner panel of the hood, and the front upper end portion of the thermal damage preventing cover is provided with a fixing hook fastened thereto by penetrating through the housing and the inner panel of the hood while having an interval.

The lower surface of the housing is provided with a supporting part downwardly protruded at a front side of the hinge part to thereby be supported on the thermal damage preventing cover and the supporting part is fastened to the thermal damage preventing cover.

The cut line is configured of an upper line formed on the upper portion of the rear surface of the housing and side lines downwardly extended from both ends of the upper line.

The side lines are formed along edge portions of both side ends of the rear surface of the housing.

A first additional cut line extended to be downwardly branched is formed at a center of the upper line.

A second additional cut line is formed between the first additional cut line and the side lines of both sides to be downwardly branched.

The second additional cut line may have an inclined shape so as to form an acute angle with the upper line.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
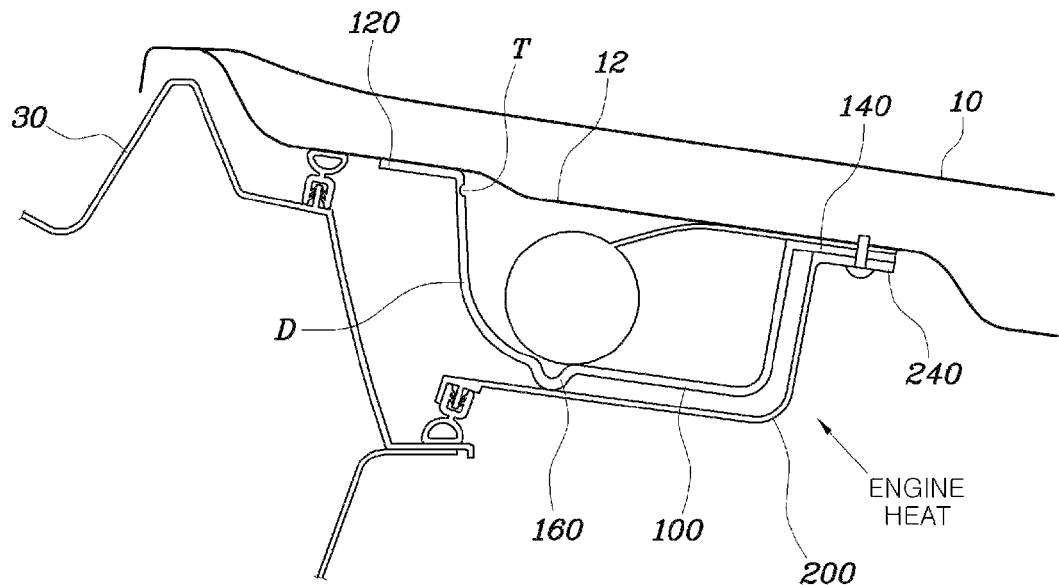
FIG. 1 is a cross-sectional view of a pedestrian air-bag for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will now be described in detail with reference to the accompanying drawings.

Figure 2:
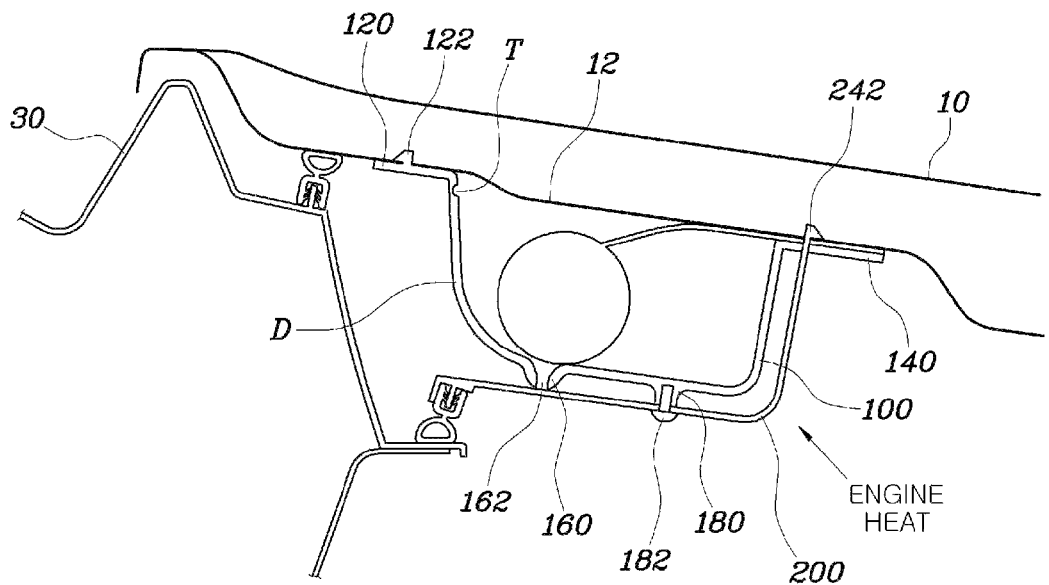
FIG. 2 is another cross-sectional view of a pedestrian air-bag for a vehicle according to an exemplary embodiment of the present invention.
Figure 3:
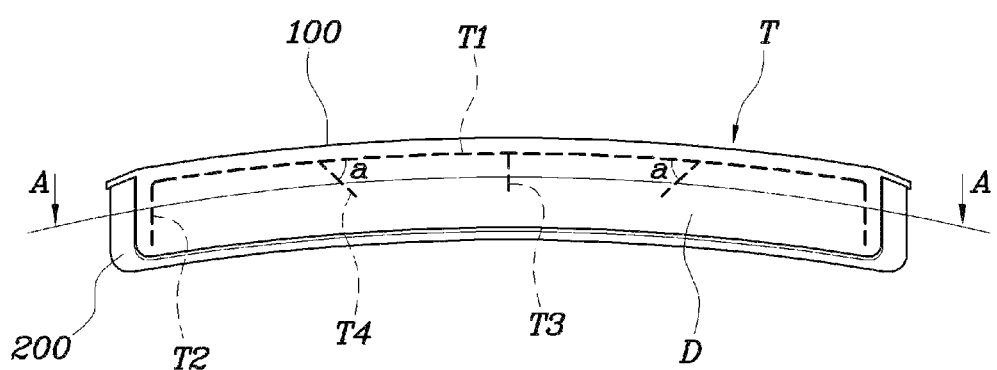
FIG. 3 is a view showing a door of the pedestrian air-bag for the vehicle according to an exemplary embodiment of the present invention.
Figure 4:
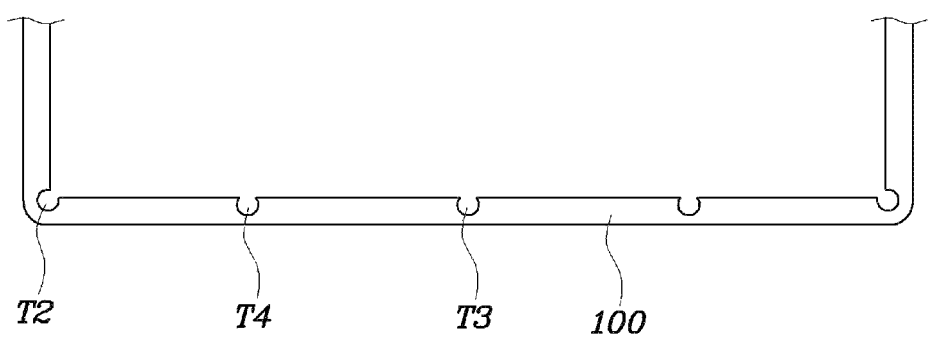
FIG. 4 is a cross-sectional view of the door of the air-bag taken along the line A-A of FIG. 3.

FIG. 1 is a cross-sectional view of a pedestrian air-bag for a vehicle according to an exemplary embodiment of the present invention, FIG. 2 is another cross-sectional view of a pedestrian air-bag for a vehicle according to an exemplary embodiment of the present invention, FIG. 3 is a view showing a door of the pedestrian air-bag for the vehicle according to an exemplary embodiment of the present invention, and FIG. 4 is a cross-sectional view of the door of the pedestrian air-bag for the vehicle according to an exemplary embodiment of the present invention.

A structure in which the pedestrian air-bag is installed in a hood of the vehicle is mainly classified into a structure in which the pedestrian air-bag is installed at an inside of a cowl cover and a structure in which the pedestrian air-bag is installed at an outside of the cowl cover. Among these structures, in the case in which the pedestrian air-bag is installed at the inside of the cowl cover, it is difficult to match an existing role of the cowl cover and to prevent foreign material from being introduced or seal water.

Therefore, it is appropriate to install the pedestrian air-bag at the outside of the cowl cover to protect a pedestrian air-bag module. In a case of this structure, however, thermal damage to the air-bag module by engine heat may not be prevented.

In order to solve this problem, the present invention introduces a thermal damage preventing cover and optimizes a door structure to thereby allow the air-bag to be stably inflated.

Specifically, FIGS. 1 and 2, which are cross-sectional views of the pedestrian air-bag for the vehicle according to the exemplary embodiment of the present invention, show different parts from each other. A housing 100 embedding the air-bag module therein is coupled to a lower end surface of a windshield side of a hood of the vehicle. In addition, the housing 100 is supported by a cowl panel 30. Therefore, an existing cowl structure is not changed, but thermal damage caused by engine heat needs to be prevented instead.

To this end, the housing 100 has a cut line T formed at an upper portion of a rear surface and a hinge part 160 formed at a lower portion of the rear surface to be downwardly protruded, such that the cut line T and the hinge part 160 may configure an air-bag door D.

Figure 5:
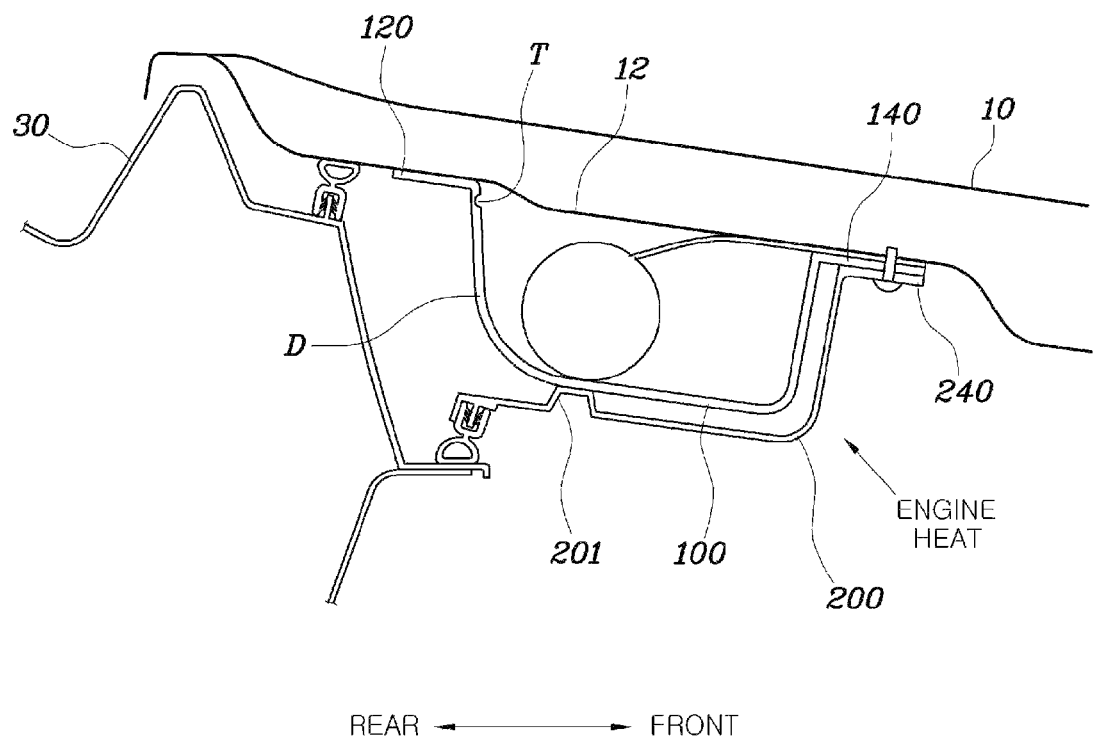
FIG. 5 is a cross-sectional view of a pedestrian air-bag for a vehicle according to another exemplary embodiment of the present invention.

FIG. 5 is a cross-sectional view of a pedestrian air-bag for a vehicle according to another exemplary embodiment of the present invention and in this case, the hinge part is configured by a rib 201 protruded from a thermal damage preventing cover 200.

In addition, the thermal damage preventing cover 200 preventing thermal damage from the engine is provided so as to be spaced apart from a lower portion of the housing 100. Air or an insulating material is provided between the housing 100 and the thermal damage preventing cover 200, thereby implementing insulation.

In addition, the thermal damage preventing cover 200 having a shape covering a lower surface and a front surface of the housing blocks direct radiation of engine heat and opens a rear surface thereof at which engine heat is not radiated, thereby reducing unnecessary weight. A rear end portion of the thermal damage preventing cover 200 supports the hinge part of the housing 100.

By the configuration as described above, the rear surface itself of the housing 100 forms the door D, and when the cushion is cut, the cut line is torn and the rear surface of the housing 100 is opened, such that the door D is formed. In this case, the hinge part 160 is supported on the thermal damage preventing cover 200, thereby stably supporting the door D in place without being drooped.

Meanwhile, as shown in FIG. 2, the hinge part 160 may be provided with a drain hole 162 penetrating through the hinge part 160 toward the thermal damage preventing cover 200 while having an interval. Therefore, by the configuration as described above, the hinge part 160 may be configured and moisture damped in an inside of the housing 100 may be removed.

Meanwhile, as shown in FIG. 2, the housing 100 having a shape in which an upper portion thereof is opened is coupled to a lower surface of an inner panel 12 of the hood in a state in which the air-bag module is embedded therein, and an upper end of the rear portion of the housing 100 may be provided with a fastening hook 122 fastened thereto by penetrating through the inner panel 12 of the hood while having an interval. By the configuration as described above, the housing 100 may be provisionally fastened to a lower surface of the hood 10 in one-touch type.

In addition, a front upper end portion of the housing 100 and a front upper end portion of the thermal damage preventing cover 200 may be coupled together to the inner panel 12 of the hood, and the thermal damage preventing cover 200 may be provided with a fixing hook 242 fastened thereto by penetrating through the housing 100 and the inner panel 12 of the hood while having an interval.

In addition, as shown in FIG. 2, a supporting part 180 which is downwardly protruded at a front side of the hinge part 160 to thereby be supported on the thermal damage preventing cover 200 may be formed on a lower surface of the housing and the supporting part 180 may be fastened to the thermal damage preventing cover 200 as shown as 182. By the configuration as described above, a structural defect of a cantilever shape in that a lower surface of the thermal damage preventing cover 200 is downwardly drooped may be overcome.

FIG. 3 is a view showing a door of the pedestrian air-bag for the vehicle according to an exemplary embodiment of the present invention and FIG. 4 is a cross-sectional view of the door of the air-bag taken along the line A-A of FIG. 3.

The cut line T for forming the door D formed on the rear surface of the housing 100 may be configured of an upper line T1 formed on an upper portion of the rear surface of the housing 100 and side lines T2 downwardly extended from both ends of the upper line T1. In addition, particularly as shown in FIG. 4, the side lines T2 may be formed along edge portions of both side ends of the rear surface of the housing. By the configuration as described above, the door is guided to be easily opened by stress concentration.

In addition, a T line T3 extended to be downwardly branched may be formed at the center of the upper line T1. By the configuration as described above, the cut from the center may be guided. In addition, an additional line T4 may be formed between the T line T3 and the side lines T2 of both sides to be downwardly branched. Particularly, the additional line T4 may have an inclined shape so as to form an acute angle with the upper line T1. By the configuration as described above, the door D is guided to be easily opened while being gradually opened.

In the case in which an angle formed between the additional line T4 and the upper line T1 is an obtuse angle, an additional cut is very difficult. Therefore, by forming this angle a as the acute angle, the cut line may be more easily torn.

According to the pedestrian air-bag for the vehicle configured by the above-mentioned structure, it is possible to prevent the air-bag module from being thermally damaged by the engine heat and to provide the optimized shape of the thermal damage preventing cover.

In addition, it is possible to prevent thermal damage without changing the design of the vehicle engine room and prevent the foreign materials from being introduced. In addition, the air-bag cushion may be stably inflated.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A pedestrian air-bag for a vehicle, the pedestrian air-bag comprising:
    a housing coupled to a lower end surface of a windshield side of a hood of the vehicle and having:
        a cut line formed at an upper portion of a rear surface in the housing; and
        a hinge part formed at a lower portion, wherein the cut line and the hinge part forms an air-bag door;
    an air-bag module embedded in the housing; and
    a thermal damage preventing cover spaced apart from a lower portion of the housing,
    wherein the thermal damage preventing cover covers a lower surface and a front surface of the housing, and includes a rear end portion supporting the hinge part of the housing, and
    wherein the hinge part of the housing protrudes downwardly from the lower portion of the housing.

2. The pedestrian air-bag of claim 1, wherein the hinge part is provided with a drain hole penetrating through the hinge part toward the thermal damage preventing cover.

3. The pedestrian air-bag of claim 1,
    wherein the housing is coupled to a lower surface of an inner panel of the hood in a state in which the air-bag module is embedded therein, and
    wherein an upper end of the rear portion of the housing is provided with a fastening hook fastened thereto by penetrating through the inner panel of the hood.

4. The pedestrian air-bag of claim 1,
    wherein a front upper end portion of the housing and a front upper end portion of the thermal damage preventing cover are coupled together to an inner panel of the hood, and
    wherein the front upper end portion of the thermal damage preventing cover is provided with a fixing hook fastened thereto by penetrating through the housing and the inner panel of the hood.

5. The pedestrian air-bag of claim 1, wherein the lower surface of the housing is provided with a supporting part downwardly protruded at a front side of the hinge part to thereby be supported on the thermal damage preventing cover and the supporting part is fastened to the thermal damage preventing cover.

6. The pedestrian air-bag of claim 1, wherein the cut line is configured of an upper line formed on the upper portion of the rear surface of the housing and side lines downwardly extended from both ends of the upper line.

7. The pedestrian air-bag of claim 6, wherein the side lines are formed along edge portions of both side ends of the rear surface of the housing.

8. The pedestrian air-bag of claim 6, wherein a first additional cut line extended to be downwardly branched is formed at a center of the upper line.

9. The pedestrian air-bag of claim 8, wherein a second additional cut line is formed between the first additional cut line and the side lines of both sides to be downwardly branched.

10. The pedestrian air-bag of claim 9, wherein the second additional cut line has an inclined shape so as to form an acute angle with the upper line.

* * * * *